(12) United States Patent
Shimizu

(10) Patent No.: US 8,854,034 B2
(45) Date of Patent: Oct. 7, 2014

(54) POSITION DETECTOR AND POSITION DETECTION METHOD

(75) Inventor: Tetsuya Shimizu, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 276 days.

(21) Appl. No.: 13/080,920

(22) Filed: Apr. 6, 2011

(65) Prior Publication Data

US 2011/0248707 A1 Oct. 13, 2011

(30) Foreign Application Priority Data

Apr. 12, 2010 (JP) .................................. 2010-091107

(51) Int. Cl.
- *G01B 7/00* (2006.01)
- *G01R 33/00* (2006.01)
- *G01D 5/244* (2006.01)

(52) U.S. Cl.
CPC .................................. *G01D 5/24495* (2013.01)
USPC ............ 324/207.12; 324/207.16; 324/207.24; 702/94; 702/150

(58) Field of Classification Search
CPC .............. G01D 5/2451; G01D 5/2454; G01D 5/24495; G01D 5/2497
USPC .................. 324/200, 207.11, 207.12, 207.13, 324/207.15, 207.22, 207.24, 207.26
See application file for complete search history.

(56) References Cited

U.S. PATENT DOCUMENTS

| | | | |
|---|---|---|---|
| 4,589,038 A | 5/1986 | Radtke | |
| 4,983,900 A * | 1/1991 | Nashiki et al. | 318/652 |
| 5,723,975 A * | 3/1998 | Rogers | 324/72.5 |
| 7,432,497 B2 * | 10/2008 | Sakagami et al. | 250/231.18 |
| 7,659,997 B2 * | 2/2010 | Hori | 356/620 |
| 2005/0077424 A1 * | 4/2005 | Schneider | 244/3.11 |
| 2008/0113102 A1 | 5/2008 | Arai et al. | |
| 2008/0133102 A1 | 6/2008 | Kubo | |
| 2008/0238413 A1 | 10/2008 | Anderson | |
| 2008/0285586 A1 * | 11/2008 | Harding et al. | 370/464 |

FOREIGN PATENT DOCUMENTS

| | | | | |
|---|---|---|---|---|
| JP | 02064405 A | * | 3/1990 | ............ G01B 21/00 |
| JP | 2003-222512 | | 8/2003 | |
| JP | 2005/337757 | | 12/2005 | |
| JP | 2008/140144 | | 6/2008 | |
| JP | 2009/002660 | | 1/2009 | |

OTHER PUBLICATIONS

Office Action from Japanese Application No. 2010-091107 (including English Translation), dated Jan. 27, 2012, 5 pages.

European Search Report from corresponding Application No. 11161184.4-2213 dated Aug. 12, 2011, 7 pages.

* cited by examiner

*Primary Examiner* — Huy Q Phan
*Assistant Examiner* — James Split
(74) *Attorney, Agent, or Firm* — Fish & Richardson P.C.

(57) ABSTRACT

A position detector having a plurality of sensor units is used. Each of the sensor units is configured to determine positions. The sensor units are selectively used for outputting positions of a moving object. Positional outputs are generated by combining outputs from a plurality of sensor units in a segment where the plurality of sensor units output positions together, for allowing the positional outputs to change continuously from a start to an end of the segment.

8 Claims, 6 Drawing Sheets

POSITION DETECTOR AND POSITION DETECTION METHOD

CLAIM OF PRIORITY

This application claims priority under the Paris Convention and/or under 35 U.S.C. 119 (a)-(d) to Japanese Application Number 2010-091107, filed on Apr. 12, 2010, the entire contents of which are hereby incorporated by reference.

FIELD OF THE INVENTION

The present invention relates to a position detector for detecting positions of a moving object such as a traveling vehicle, a transfer apparatus, a head of a working machine or a workpiece. Further, the present invention relates to a position detection method.

BACKGROUND ART

The applicant developed a sensor for measuring positions of a moving object such as a traveling vehicle, a transportation apparatus, a transfer apparatus, a head of a working machine or a workpiece (e.g., Patent Publication 1: JP2009-2660A). This position detector uses a combination of magnetizable material and non-magnetizable material or a magnet or the like as a mark, and uses coil arrays to determine positions based on the mark. That is, phases of signals outputted from coil arrays are different depending on the relative position to the mark, and the difference are used to determine the position based on the mark. Further, in the case where a plurality of marks are present, an offset is stored for each of the marks, and the offset is added to the position based on the mark to determine an absolute position.

Next, for example, a case where a range of measuring the position is large will be considered. It is assumed that a movement stroke of a moving object, or the entire length of a travel route is large. In order to continuously detect the position in the case where the measurement range is large, it is effective to provide a pair of position detectors at least on left and right sides of the moving object, provide the marks on left and right sides of the moving route of the moving object, and detect the marks using any of the position detectors all the time (Patent Publication 2: JP2008-140144A). However, the inventor found that, at the time of switching between a pair of left and right position detectors, the indicator value indicating the position of the moving object changes discontinuously. If the position changes discontinuously, large noises will be inputted to a servo system operated based on the indicator value from the position detectors disadvantageously.

SUMMARY OF THE INVENTION

In the present invention, a plurality of sensor units are provided for continuously detecting positions, and an object of the present invention is to prevent discontinuous changes of outputs of the position in a segment where two or more sensor units each outputting positions are present.

The present invention relates to a position detector having a plurality of sensor units each configured to determine positions. The position detector selectively uses the sensor units for outputting positions of a moving object.

The position detector includes a smoothing unit for generating positional outputs by combining outputs from a plurality of the sensor units in a segment where the plurality of sensor units output positions together, for allowing the positional outputs to change continuously from a start to an end of the segment.

Further, the present invention relates to a position detection method using a position detector having a plurality of sensor units each configured to determine positions. The position detector selectively uses the sensor units for outputting positions of a moving object. The method includes the step of generating positional outputs using a smoothing unit of the position detector by combining outputs from a plurality of the sensor units in a segment where the plurality of sensor units output positions together, for allowing the positional outputs to change continuously from a start to an end of the segment. In this specification, description regarding the position detector is directly applicable to the position detection method, and conversely, description regarding the position detection method is directly applicable to description regarding the position detector.

In this manner, at the time of switching the sensor units, in a segment where outputs from a plurality of sensor units are obtained, the outputs (indicator values) of the position does not change discontinuously. Therefore, no excessive burden is applied to the servo system or the like using the signal from the position detector. The position detector may be mounted in the moving object to detect marks on the ground. Alternatively, marks may be provided on the moving object, and the position detector on the ground may detect the marks of the moving object to determine the position of the moving object.

In an example, in the segment, an outputs D of the position detector is determined based on an equation of $D=DL-(DL-DR)\times X/L1$, where DL denotes positions based on outputs from a first sensor unit of the plurality of sensor units, DR denotes positions based on outputs from a second sensor unit of the plurality of sensor units, L1 denotes length of the segment in a moving direction of the moving object, X denotes a relative position of the moving object in the segment, $X=0$ on a side where only the first sensor unit is valid, and $X=L1$ on a side where only the second sensor unit is valid. In this manner, the position of the moving object can be determined by simple interpolation computation. Further, the difference between outputs of the sensor units are dispersed over the entire length of the segment. It should be noted that any one of, e.g., a pair of the sensor units may be referred to as L or R. In the above equation, the suffixes L and R may not correspond to left and right sides physically. L may be the sensor unit on the right side, and R may be the sensor unit on the left side. However, in this approach, at the position where $X=1$ and the position where $X=L1$, though the position is continuous, it does not change smoothly. For the purpose of smoothing of the position, for example, assuming that $y=X/L1-0.5$ and $DL-DR=C$, a function of $C(y)=1/(1+\exp(-n\times y))$, $D=DL+C$ or the like may be used. This is a sigmoid function used in neural network where n is a positive number, e.g., in a range of 5 to 100. If $y=-0.5$, this function has a value of about 0. If $y=0$, this function has a value of ½. If $y=0.5$, this function has a value of about 1. However, since an exponential function is required for computation, it is not possible to suitably determine the position at high speed. Errors are compressed in an area where y is about 0.5. Therefore, the burden applied to the external servo system becomes large.

In another example, each of the plurality of sensor units is a coil array. The position detector includes a common power supply for driving a plurality of coil arrays, a detection circuit for converting the outputs from the coil array into outputs of the detection circuit, and a switch for selectively inputting outputs from the plurality of coil arrays to use the detection circuit as a common detection circuit shared between the plurality of coil arrays. The switch is switched in the segment to convert the outputs from the plurality of coil arrays alternately into the outputs of the common detection circuit. In this manner, not only the detection circuit can be shared but also the difference in the indicator value of the position due to variation of the detection circuit can be eliminated. The difference in the indicator value of the position is due to the use of different detection circuits in addition to installation precision of marks and variation of each sensor unit. Therefore, by using the common detection circuit, the difference resulting from the use of detection circuits can be eliminated from the beginning.

In still another example, in the segment, a prediction computation unit is provided for performing extrapolation of time series data of positions based on an output from each coil array to positions at current time to determine a temporal current position of each coil array. In the smoothing unit, respective outputs of the temporal current positions of the coil arrays are combined to generate the position of the moving object. By sharing the detection circuit, since the sensor units are used alternately, in each of the individual sensor units, the cycle of obtaining the outputs from the sensor unit is doubled. In the meanwhile, in order to determine the position, it is necessary to obtain the indicator values from the plurality of sensor units at the same time. Therefore, by extrapolation of the indicator values from the sensor units to determine temporal current positions, the position of the moving object can be determined all the time without being affected by the influence resulting from sharing of the detection circuit.

Figure 1:
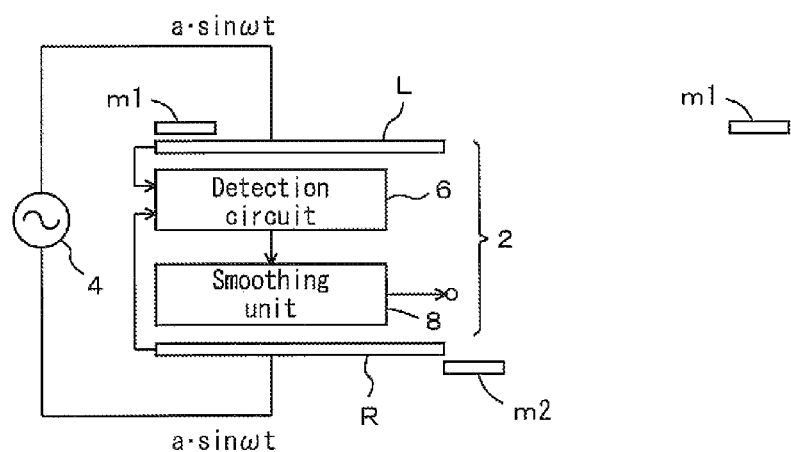
FIG. 1 is a diagram showing magnetic marks, coil arrays, a detection circuit, and a smoothing unit according to an embodiment.

Hereinafter, an embodiment will be described. The scope of the invention shall be determined according to understanding of a person skilled in the art based on the description of the claims in consideration of the description of the specification and techniques known in this technical field.

DETAILED DESCRIPTION

FIGS. 1 to 7 show the embodiment. In the drawings, reference numerals m1, m2 denote magnetic marks provided along left and right sides of a travel rail for moving objects (not shown), e.g., overhead traveling vehicles in the embodiment. For example, the mark is a combination of magnetizable material and non-magnetizable material, or a permanent magnet or the like. A position detector 2 is attached to a moving object (not shown), and made up of a pair of left and right coil arrays L, R (left and right sensor units), a common alternating current power supply circuit for driving the coil arrays L, R, a common detection circuit 6, and a smoothing unit 8.

Figure 2:
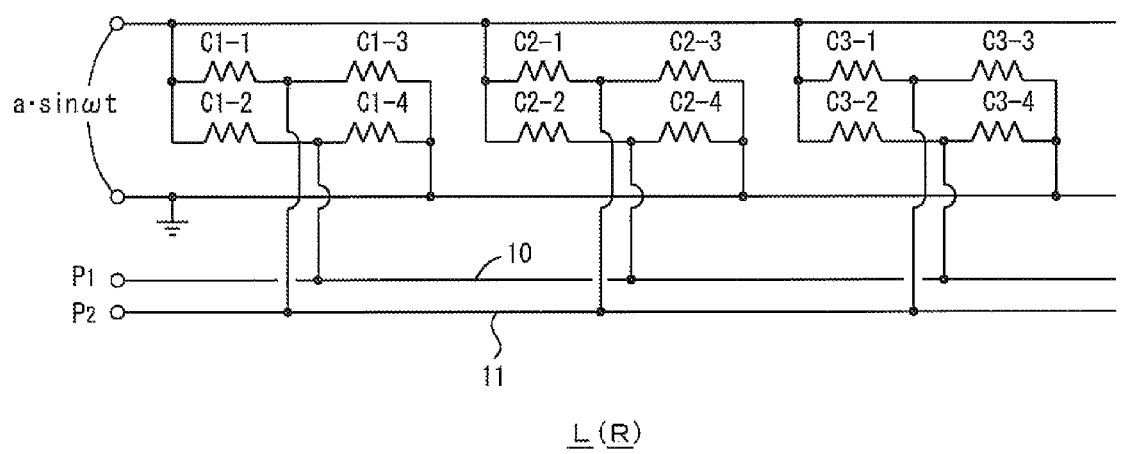
FIG. 2 is a block diagram showing the coil array according to the embodiment.

The coil arrays L, R have the same structure. A layout of coils of the coil arrays L, R is shown in FIG. 2. For example, four coils C1-1 to C1-4 are arranged in one set, and likewise, coils C2-1 to C2-4 are arranged in one set, and coils C3-1 to C3-4 are arranged in one set. The other coils are arranged in the same manner. Two outputs are collected from four coils of each set as outputs P1, P2 of the coil arrays. Further, the coils C1-1 to C3-4 are arranged in series in the order of C1-1, C1-2, C1-3, C1-4, C2-1, C2-2, . . . etc.

Figure 3:
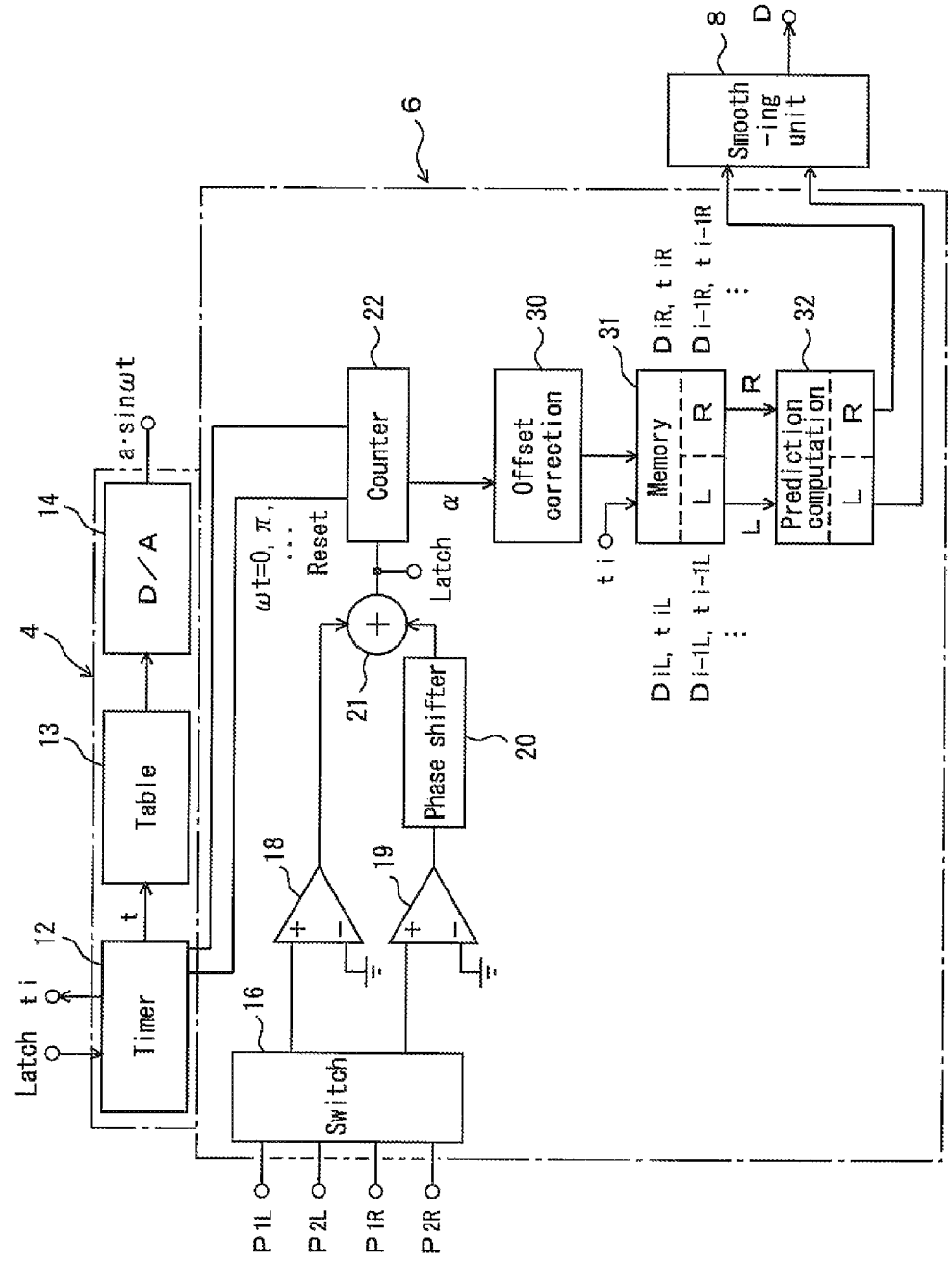
FIG. 3 is a block diagram showing the detection circuit and the smoothing unit according to the embodiment.

FIG. 3 shows structure of a detection circuit 6 or the like. An alternating current power supply circuit 4 includes a timer 12 having a clock circuit, a table 13 for reading a signal corresponding to sin $\omega$t from the timer 12, and a D/A converter 14 for performing D/A conversion of the outputs of the table 13 to output a signal a×sin $\omega$t corresponding to the alternating current waveform voltage. In the detection circuit 6, timing where the alternating current signal sin $\omega$t becomes 0 is important. At this timing, the counter 22 as described later is reset. In the detection circuit 6, when sin($\omega$t+$\alpha$) becomes 0, the clock outputs from the timer 12 are latched, and the time ti is outputted. $\alpha$ denotes a phase relative to the mark, and denotes displacement based on the mark. The value obtained by adding an offset to $\alpha$ is an indicator value of positions of each sensor unit.

As shown in FIG. 2, a pair of signals P1, P2 are obtained from the coil arrays L, R. Since there are two sets of the coil arrays, two sets of signals (P1L, P2L), (P1R, P2R) are outputted to the detection circuit 6. In the detection circuit 6, the signals (P1L, P2L) and (P1R, P2R) are switched alternately by a switch 16 for processing. Reference numerals 18, 19 denote a pair of operational amplifiers. The operation amplifier 18 obtains a signal corresponding to b×cos $\alpha$×sin $\omega$t, and the operational amplifier 19 obtains a signal corresponding to b×sin $\alpha$×sin $\omega$t. A phase shifter 20 advances the phase of $\omega$t of the operational amplifier 19 by 90° to output a signal corresponding to b×sin $\alpha$×cos $\omega$t. For this purpose, for example, the signal is delayed by $\pi$/2 of $\omega$t, and negative to positive conversion or positive to negative conversion is performed. An adder 21 adds the signal of b×cos $\alpha$×sin $\omega$t from the operational amplifier 18 to the signal of b×sin $\alpha$×cos $\omega$t from the phase shifter 20, and outputs a signal corresponding to b×sin($\omega$t+$\alpha$) using addition theorem.

$\alpha$ denotes a position of the coil array relative to the magnetic mark in the phase in a range of 0 to 2$\pi$, i.e., $\alpha$ is a position based on the magnetic mark. Each time sin $\omega$t becomes 0, the counter 22 is reset by a signal from the timer 12. Then, the time until sin($\omega$t+$\alpha$) becomes 0 is counted. Conversely, the time until sin $\omega$t becomes 0 after sin($\omega$t+$\alpha$) became 0 may be counted. Data of $\alpha$ is obtained from the counter 22. Since this data is based on the magnetic mark, an offset correction unit 30 performs offset correction of the data, and converts the data into an indicator value Di of positions of the moving object. The series of processing as described above is performed for left and right magnetic marks m1, m2 alternately. For the left magnetic mark m1, an indicator value DiL and time series data of the detection time tiL are obtained. For the right magnetic mark m2, an indicator value DiR and time series data of the detection time tiR are obtained. These two types of time series data are stored in a memory 31.

Figure 4:
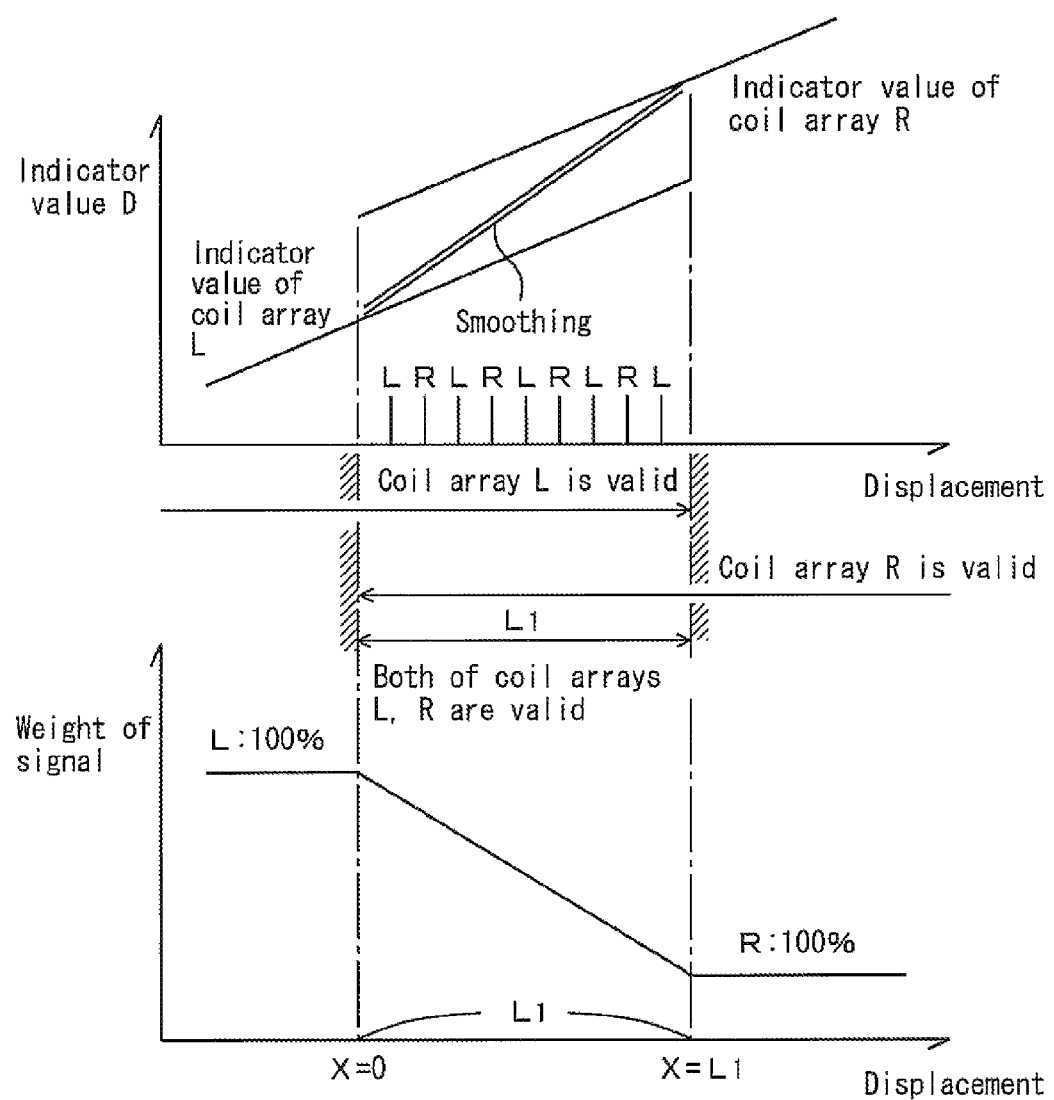
FIG. 4 includes graphs showing smoothing at the time of switching the coil arrays and the weight w of each coil array.

A prediction computation unit 32 performs prediction computation of the current position DiL based on the coil array L using the time series data from the coil array L in the memory 31. Likewise, the prediction computation unit 32 performs prediction computation of the current position DiR based on the coil array R using the time series data from the coil array R. In a segment where only the coil array L is valid, prediction computation for only the current position based on the coil array L is performed. Likewise, in a segment where only the coil array R is valid, prediction computation for only the current position based on the coil array R is performed. Prediction computation is at least performed in a segment where both of the coil array L and the coil array R are valid (overlapping area). In the embodiment, weighted averaging is performed as smoothing. As shown in FIG. 4, a smoothing unit 8 averages prediction computation values of two current values regarding the coil array L and the coil array R using X/L1 as a weight, and outputs an indicator value D of the current position. The meaning of X/L1 is shown in FIG. 4.

FIG. 4 shows smoothing of indicator values from the coil arrays L, R. On the left side in FIG. 4, only the coil array L is valid. On the right side in FIG. 4, only the coil array R is valid. A segment where both of the coil array L and the coil array R are valid is present between the left side and right side of FIG. 4. This segment is a target of smoothing. The length of the segment is L1. In this segment, smoothing is performed as shown by a double line in FIG. 4. In this segment, indicator values are outputted from the coil arrays L, R at timings of vertical lines in FIG. 4. Prediction computation of these indicator values are performed by the prediction computation unit to convert the indicator values into a continuous indicator value. The weight of the signal of the coil array L is 100% at the start of a segment where X=0, and the weight of the signal of the coil array R is 100% at the end of a segment where X=L1. For example, the weight changes linearly between these points.

Figure 5:
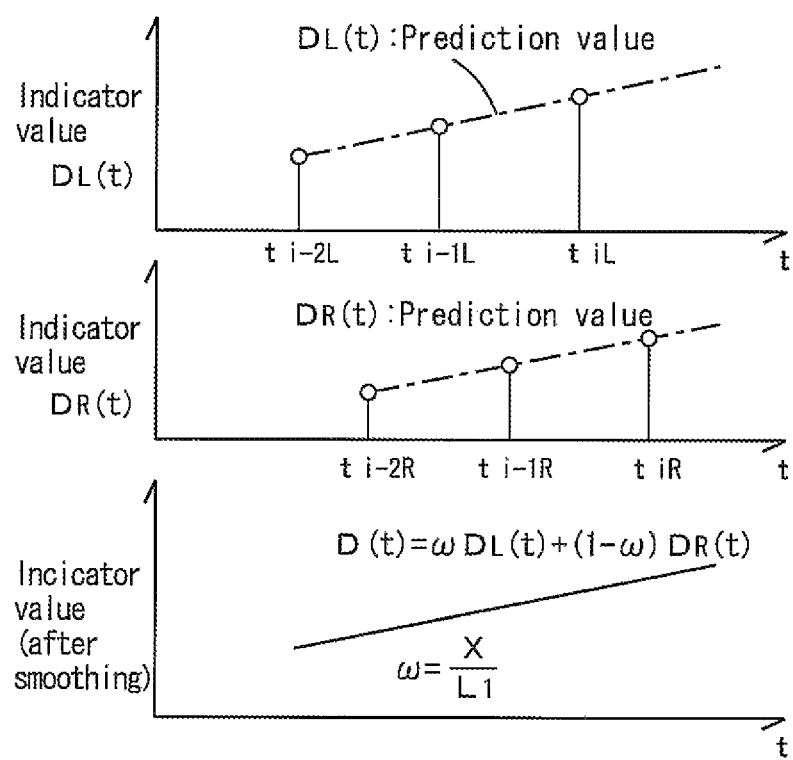
FIG. 5 includes graphs showing prediction of the current position based on signals from coil arrays and smoothing.

FIG. 5 schematically shows processing from prediction computation to calculation of the indicator value after smoothing. A graph in an upper portion of FIG. 5 shows the indicator value DL from the left coil array L. For example, the indicator value DL is generated in a cycle of about 10 Hz of the alternating current power supply signal. Likewise, the indicator value DR from the right coil array R is generated in a cycle of about 10 kHz. In the area where both of the two coil arrays are valid, since the detection circuit is switched alternately, the time interval of obtaining the indicator value is twice as large as the time interval in the other segment. Further, the indicator values from the pair of coils L, R cannot be obtained at the same time. Therefore, indicator values at arbitrary points are temporarily determined. Then, as shown in a graph in a lower portion of FIG. 5, the temporarily determined indicator values are averaged using the weight w to generate the indicator value D(t) at the time t. The weight w is X/L1.

Figure 6:
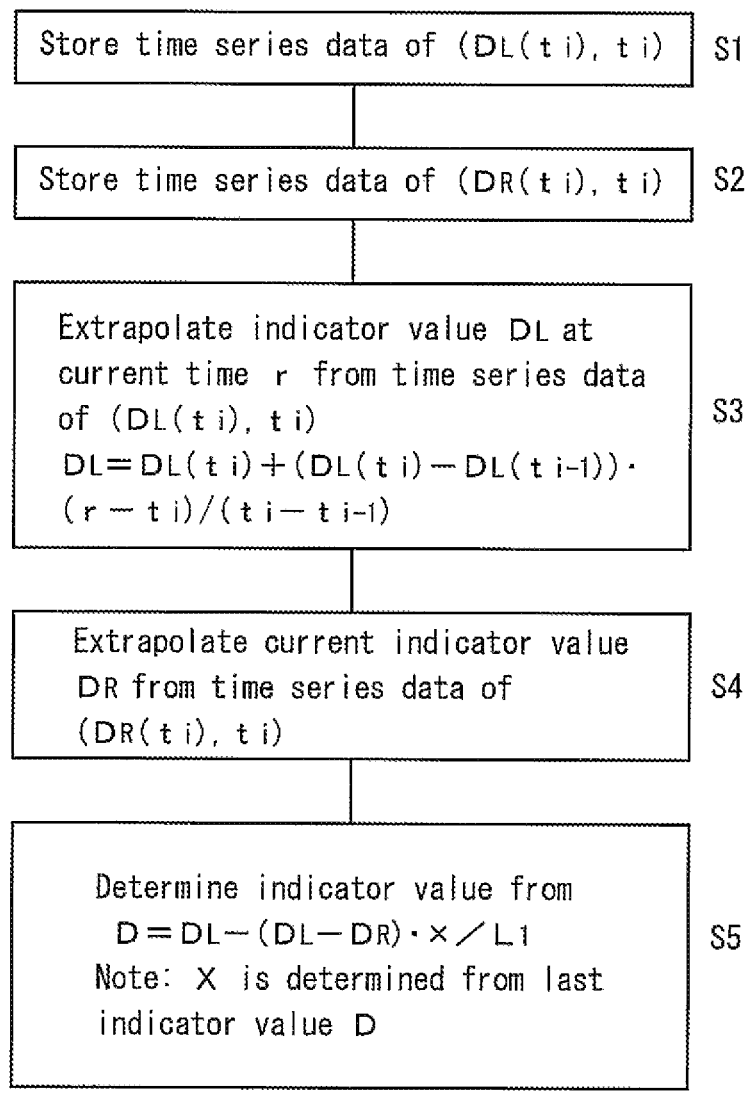
FIG. 6 is a flow chart showing an algorithm of smoothing.

FIG. 6 shows a processing algorithm in the overlapping segment where both of the coil arrays L and R are valid. In step 1, an indicator value from the coil array L and the time series data of the detection time are stored. In step 2, outputs DR from the coil array R and time series data of the detection time are stored. Step 1 and step 2 are performed alternately. In step 3, with respect to the coil array L, the indicator value DR at the current time r is determined by extrapolation of the time series data obtained from the coil array L. Likewise, in step 4, with respect to the coil array R, the indicator value DR at the current time is determined by extrapolation. Step 3 and Step 4 are performed alternately as well. In step 5, the two extrapolated values are weight averaged to determine the current position. Determination of the relative position X in the overlapping segment is substantially equal to determination of indicator value D. For example, a value calculated from the previous indicator value D is used as X. In the case of carrying out processing more precisely, X is determined from the previous indicator value, and the current indicator value D is determined from X. Then, X is determined again based on the current indicator value D, and then, the current indicator value D is determined again.

Figure 7:
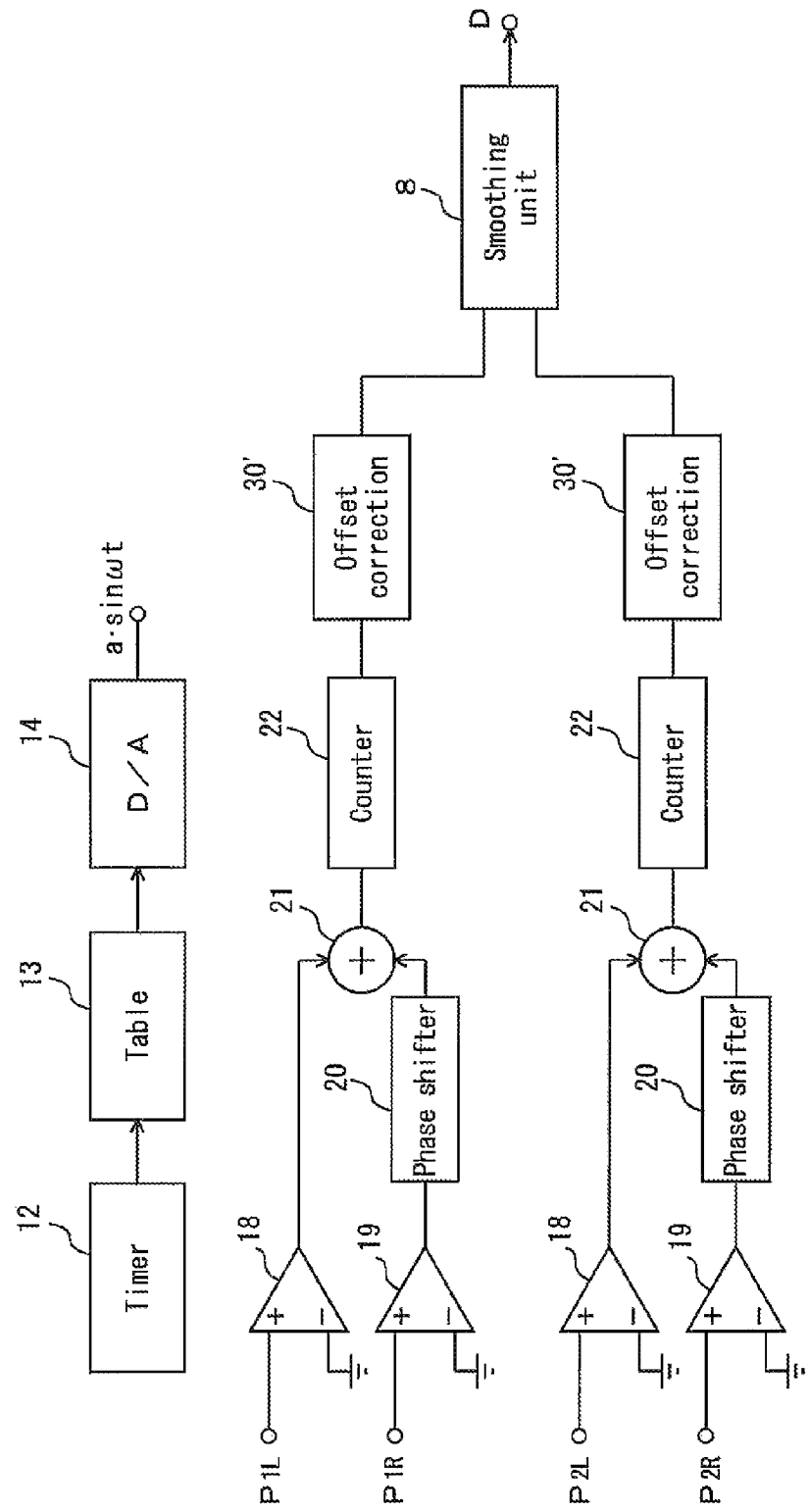
FIG. 7 is a block diagram showing detection circuits and a smoothing unit according to a modified embodiment.

FIG. 7 shows detection circuits according to a modified embodiment. A pair of coil arrays L, R are driven by a common alternating current power supply circuit made up of the timer 12, the table 13, and the D/A converter 14. In this respect, the circuit of FIG. 7 is the same as that shown in FIG. 3. In the circuit of FIG. 7, a pair of detection circuits are provided, and outputs from the separate detection circuits are smoothed by a smoothing unit 8 in accordance with the manner shown in FIG. 4. Therefore, in an offset correction unit 30', offset correction of only one indicator value from one coil is performed. Further, since the indicator values from left and right coil arrays can be obtained substantially at the same time, prediction computation is omitted. In the circuit shown in FIG. 7, the pair of detection circuits are required. Additionally, since the signals from the left and right coil arrays L, R are processed by the separate detection circuits, errors based on the variation in the characteristics of the detection circuits occur. In other respect, the detection circuit of FIG. 7 are the same as the detection circuit 6 shown in FIG. 3.

In the embodiment, the following advantages are obtained.

(1) In the overlapping segment where signals are obtained from both of the pair of coils, the outputs from the position detector do not change discontinuously. Therefore, no excessive load is applied to the servo system or the like using the signal from the position detector for control.

(2) By determining the positional outputs as $D=DL-(DL-DR) \times X/L1$, the position can be determined by simple computation. Further, the errors can be dispersed over the entire overlapping segment.

(3) Sharing of the detection circuit is advantageous in terms of cost, and no errors due to variation of the detection circuit occur.

(4) By predicting the current position based on the prediction computation unit, since the detection circuit is shared, it becomes possible to solve the problem that the left and right indicator values cannot be obtained at the same time. Further, the current indicator value can be predicted substantially at any position. Further, also in segments other than the overlapping segment, the indicator value can be outputted regardless of the alternating current cycle of driving the coil arrays.

The components such as the offset correction unit 30, the memory 31, the prediction computation unit 32, the smoothing unit 8, the timer 12, the table 13, the D/A converter 14 may be provided as discrete circuits. Alternatively, these components may be provided as computer structure made up of hardware and software.

DESCRIPTION OF THE NUMERALS

2: position detector
4: alternating current power supply circuit
6: detection circuit
8: smoothing unit
10, 11: signal line
12: timer
13: table
14: D/A converter
16: switch
18, 19: operational amplifier
20: phase shifter
21: adder
22: counter
30: offset correction segment
31: memory 32: prediction computation segment
m1, m2: magnetic mark
L, R: coil array
C1-1 to C3-4: coil
D: indicator value
t: time
P1, P2: outputs of coil array
L1: length of overlapping portion
X: relative coordinate in overlapping portion

What is claimed is:

1. A position detector system comprising:
a first sensor unit configured to collect first data indicative of first positions of a moving object as the moving object traverses a first side of a rail;
a first area of the position detector system where only output from the first sensor unit is valid;
a second sensor unit configured to collect second data indicative of second positions of the moving object as the moving object traverses a second side of the rail;
a second area of the position detector system where only output from the second sensor unit is valid;
a third area of the position detection system where outputs from both the first and second sensor units are valid and where the first and second sensor units alternately perform collection of the first data and the second data, respectively;
a common detection circuit that is configured to:
receive the first data from the first sensor unit;
receive the second data from the second sensor unit;
convert the first and second data into first and second raw positional outputs, respectively;
store first time series data of the first raw positional outputs in a memory; and
store second time series data of the second raw positional outputs in the memory;
a prediction computation unit that is configured to:
extrapolate the first time series data to first provisional data; and
extrapolate the second time series data to second provisional data;
a smoothing unit for applying a smoothing operation to the first and second provisional data to generate a series of positional outputs that are indicative of periodic positions of the moving object over a segment of the rail that is included in the third area;
wherein the smoothing operation averages the first and second provisional data with a weight;
wherein the weight has a value of one for provisional data that is associated with an entrance of the third area;
wherein the weight has a value of zero for provisional data that is associated with an exit of the third area; and
wherein the weight linearly changes in accordance with the entrance of the third area and the exit of the third area.

2. The position detector system of claim 1, wherein the smoothing operation is based on an equation of $D=DL-(DL-DR) \times X/L1$;
wherein DL denotes at least a portion of the first raw positional outputs that are based on the first data from the first sensor unit;
wherein DR denotes at least a portion of the second raw positional outputs that are based on the second data from the second sensor unit;
wherein L1 denotes a length of a segment along a moving direction of the moving object;
wherein X denotes relative positions of the moving object in the segment along the moving direction of the moving object.

3. The position detector system of claim 1, wherein the first sensor unit comprises a coil array and the second sensor unit comprises another coil array, and wherein the position detection further comprises:
a common power supply for driving the coil arrays; and
a switch for selectively inputting outputs from the coil arrays to the common detection circuit in accordance with the detection circuit being shared between the coil arrays.

4. The position detector system of claim 3,
wherein the prediction computation unit is further configured for extrapolating the first and second time series data of positions based on outputs from each coil array.

5. A method performed by a position detector system, comprising:
collecting, by a first sensor unit of the position detector system, first data indicative of first positions of a moving object as the moving object traverses a first side of a rail;
wherein output from the first sensor unit is only valid in a first area of the position detector system;
collecting, by a second sensor unit of the position detector system, second data indicative of second positions of the moving object as the moving object traverses a second side of the rail;
wherein output from the second sensor unit is only valid in a second area of the position detector system;
wherein outputs from both the first and second sensor units are valid in a third area of the position detector system;
wherein the first and second sensor units alternately perform collection;
receiving, by a common detection circuit of the position detector system, the first data from the first sensor unit and the second data from the second sensor unit;
converting, by the common detection circuit of the position detector system, the first and second data into first and second raw positional outputs, respectively;
storing, by the common detection circuit of the position detector system, first time series data of the first raw positional outputs in a memory; and
storing, by the common detection circuit of the position detector system, second time series data of the second raw positional outputs in the memory;
extrapolating, by a prediction computation unit, the first time series data to first provisional data and
extrapolating, by the prediction computation unit, the second time series data to second provisional data;
applying a smoothing operation to the first and second provisional data; and
generating, based on application of the smoothing operation, a series of positional outputs that are indicative of periodic positions of the moving object over a segment of the rail that is included in the third area;
wherein the smoothing operation averages the first and second provisional data with a weight;
wherein the weight has a value of one for provisional data that is associated with an entrance of the third area;
wherein the weight has a value of zero for provisional data that is associated with an exit of the third area; and
wherein the weight linearly changes in accordance with the entrance of the third area and the exit of the third area.

6. The method of claim 5, wherein the smoothing operation is based on an equation of $D=DL-(DL-DR) \times X/L1$;
wherein DL denotes at least a portion of the first raw positional outputs that are based on the first data from the first sensor unit;

wherein DR denotes at least a portion of the second raw positional outputs that are based on the second data from the second sensor unit;

wherein L1 denotes a length of a segment along a moving direction of the moving object;

wherein X denotes relative positions of the moving object in the segment along the moving direction of the moving object.

7. The method of claim 5, wherein the first sensor unit comprises a coil array and the second sensor unit comprises another coil array, and wherein the method further comprises:

driving the coil arrays; and selectively inputting outputs from the coil arrays to the common detection circuit in accordance with the common detection circuit being shared between the coil arrays.

8. The method of claim 7, further comprising:

extrapolating the first and second time series data of positions based on outputs from each coil array.

\* \* \* \* \*

UNITED STATES PATENT AND TRADEMARK OFFICE
CERTIFICATE OF CORRECTION

PATENT NO. : 8,854,034 B2  
APPLICATION NO. : 13/080920  
DATED : October 7, 2014  
INVENTOR(S) : Tetsuya Shimizu Page 1 of 1

It is certified that error appears in the above-identified patent and that said Letters Patent is hereby corrected as shown below:

In the Claims

Column 8, Line 46, Claim 5, delete "data and" and insert -- data; and --, therefor.

Signed and Sealed this
Twenty-fourth Day of March, 2015

Michelle K. Lee
*Director of the United States Patent and Trademark Office*